No. 707,317. Patented Aug. 19, 1902.
B. H. GEDGE.
ROD REEL.
(Application filed Apr. 25, 1900.)
(No Model.) 2 Sheets—Sheet 1.

Witnesses
Brayton S. Richards
Nathan R. Park

Inventor
Burton H. Gedge
By Attorney

UNITED STATES PATENT OFFICE.

BURTON H. GEDGE, OF ANDERSON, INDIANA.

ROD-REEL.

SPECIFICATION forming part of Letters Patent No. 707,317, dated August 19, 1902.

Application filed April 25, 1900. Serial No. 14,252. (No model.)

*To all whom it may concern:*

Be it known that I, BURTON H. GEDGE, a citizen of the United States, residing at Anderson, in the county of Madison and State of Indiana, have invented certain new and useful Improvements in Rod-Reels, of which the following is a specification.

My present invention is an improvement in the class of rod-reels disclosed in United States Letters Patent granted to me September 1, 1891, No. 458,572; and its object is to provide improved actuating and braking mechanism for such machines.

The invention consists in the combinations and arrangements of parts hereinafter set forth and claimed.

Figure 1:
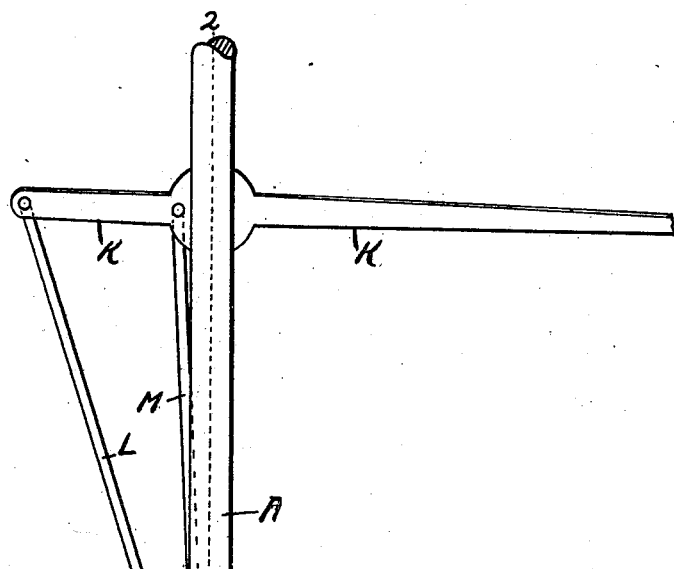
Figure 1:
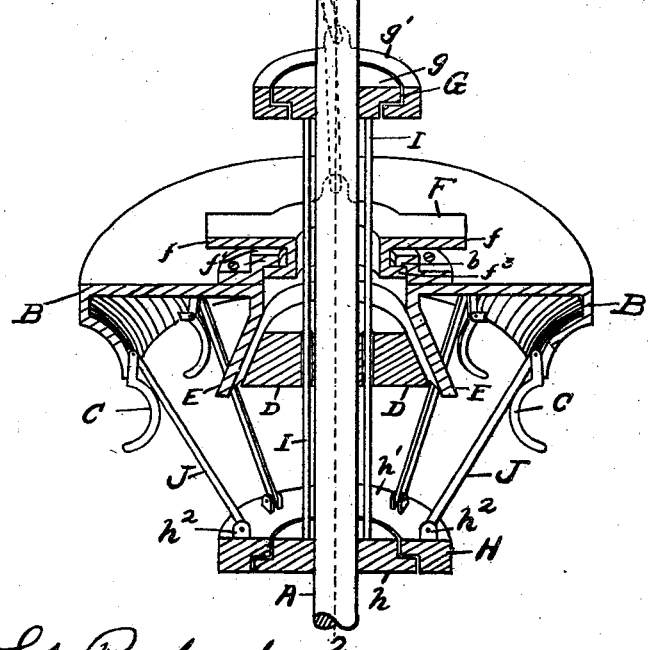
Figure 2:
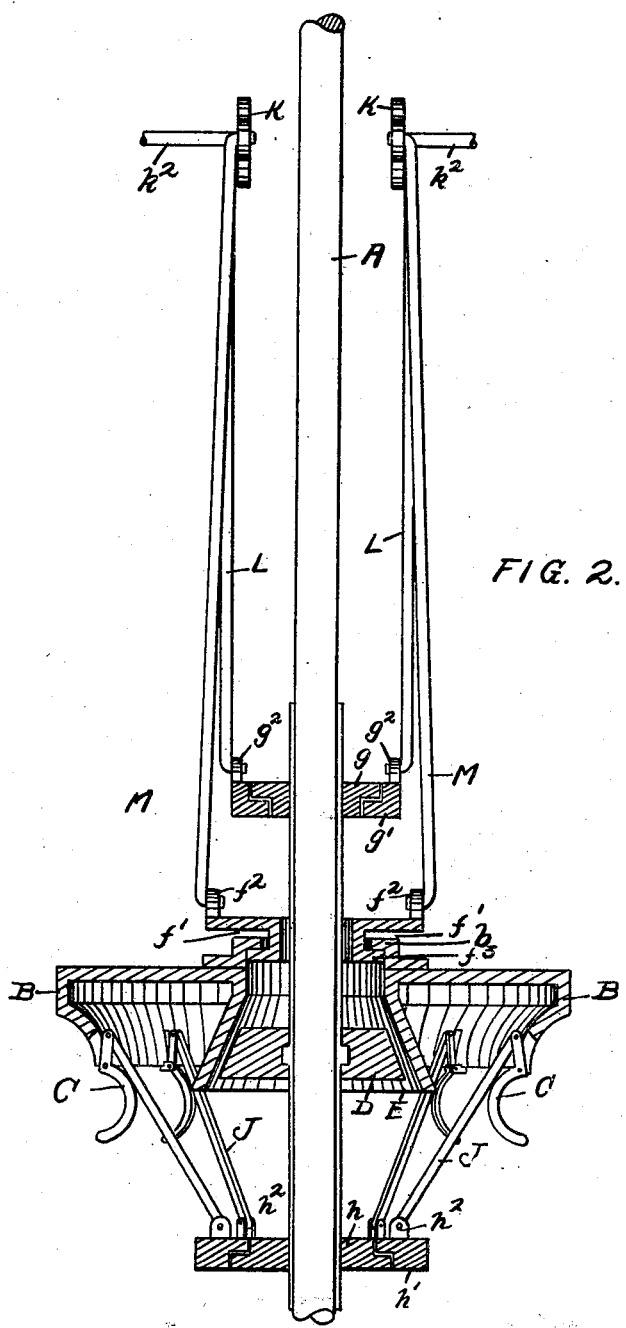

In the drawings, Figure 1 is a perspective view, partially in section, of a rod-reel embodying my invention; and Fig. 2, a section on line 2 2 of Fig. 1.

Reference-letter A denotes a vertical power-shaft; B, a coiling-drum mounted to have vertical movement and provided with coiling-hooks C; D, a conical friction-wheel rigidly mounted on shaft A; E, a friction-ring carried by drum B and adapted to engage wheel D; F, a friction brake-wheel adapted to raise drum B and check its rotations; G and H, collars slidably mounted on shaft A; I, rods connecting the inner portions of collars G and H; J, links connecting hooks C with collar H; K, a lifting-lever; L and M, links connecting lever K with collar G and brake F, respectively.

The shaft A is the usual vertical continuously-driven shaft and drum B and hooks C the usual members of this class of machines. Friction-wheel D is rigidly attached to shaft A and serves to drive drum B when the latter is lowered so as to bring friction-ring E in contact therewith. Brake-wheel F, as shown, consists of a non-rotatable plate $f$, having a channel $f'$ engaging annular flange $b$ on drum B, and is provided with lugs or ears $f^2$, with which link M engages. Collars G and H consist of rotatable inner portions $g$ and $h$, respectively, splined to shaft A and connected by rods I, passing loosely through friction-wheel D and outer portions $g'$ and $h'$, respectively. The outer portion $g'$ of collar G is provided with lugs or ears $g^2$, with which link L engages, and it so engages the inner portion $g$ that the latter may be raised or lowered by it and at the same time be free to rotate. The outer portion $h'$ of collar H is provided with lugs or ears $h^2$, with which links J engage, and it so engages the inner portion $h$ that its position is controlled by the latter, while it is free to either rotate or remain stationary. The lifting-lever K consists of two arms $k$, fastened together so as to act conjointly and fulcrumed on shafts $k^2$, which are given supports independent of shaft A. (Not shown.) Links L and M are connected with collar G and brake F, respectively, and are operated by different lengths of lever K, as shown in Fig. 1.

In operation lever K is actuated to lower drum B and collars G and H; but acting with a longer arm on collars G and H their descent is more rapid than that of drum B, so that when friction-ring E is in driving contact with wheel D hooks C are thrown out into operative position by links J. Then the wire rod is coiled upon hooks C and drum B in the usual manner. When the coil is finished, lever K is actuated to raise collars G and H and drum B through brake-wheel F. As drum B is raised, so that friction-ring E ceases to contact with friction-wheel D, the weight of the drum is supported by the engagement of flange $b$ with flange $f^3$ on brake-wheel F, the friction on which quickly stops it. Simultaneously with the raising of the drum, but at a greater speed, collars G and H are raised by link L, so that hooks C are thrown down and in and the coil dropped. Thus it will be seen that upon disengagement of friction-ring E from friction-wheel D the hooks are simultaneously withdrawn and the finished coil discharged. By the use of the brake-wheel, located as shown, the braking action occurs simultaneously with the retraction of the hooks, while the vertical movement of the brake-wheel itself severs the actuating connections between the continuously-driven shaft and the reel.

I claim as my invention—

1. A rod-reel having a friction-wheel secured to the driven shaft, a vertically-movable friction-ring having the same axis as and arranged to connect with and be driven by the said wheel, hook-shaped fingers arranged to receive the rod, and connections between the fingers and the friction-ring arranged to move them in and out upon its vertical movement; substantially as described.

2. A rod-reel having a friction-wheel secured to a driven shaft, a vertically-movable friction-drum arranged to contact with the friction-wheel and be driven thereby, a friction brake-wheel arranged to contact with the friction-drum and raise and lower it, and means for moving the brake-wheel vertically; substantially as described.

3. A rod-reel having a series of outwardly-movable hook-fingers, a brake arranged to stop the rotation of the reel, and actuating connections between the brake and the hook-fingers arranged to retract the fingers whenever the brake is applied; substantially as described.

4. The combination in a rod-reel, of a vertical driven shaft; a friction-wheel rigidly attached thereto, a friction-ring adapted to engage the friction-wheel and so mounted as to be capable of vertical movement; a coiling-drum connected with the friction-ring; coiling-hooks mounted on the drum; connections between the hooks and a slidable collar on the shaft; means for raising the friction-ring and drum; and means for simultaneously raising the collar on the shaft to withdraw the hooks; substantially as described.

5. The combination in a rod-reel, of a vertical driven shaft; a friction-wheel rigidly attached thereto; a friction-ring adapted to engage the friction-wheel and so mounted as to be capable of vertical movement; a coiling-drum connected with the friction-ring; braking and lifting members connected with the friction-ring; a brake-wheel adapted to engage the braking and lifting members; coiling-hooks mounted on the drum; connections between the hooks and a slidable collar on the shaft; means for raising the brake-wheel; and means for simultaneously raising the collar on the shaft to withdraw the hooks, substantially as described.

6. The combination in a rod-reel, of shaft A; friction-wheel D; friction-ring E; coiling-drum B; hooks C; brake-wheel F; collars G and H; rods I; links J; lever K and links L and M, substantially as described.

BURTON H. GEDGE.

Witnesses:
 BENJAMIN L. BING,
 LOUIS TEEPE.